United States Patent [19]

Cheruvu et al.

[11] Patent Number: 5,420,220
[45] Date of Patent: May 30, 1995

[54] LLDPE FILMS

[75] Inventors: Subrahmanyam Cheruvu, Robbinsville; Frederick Y. Lo, Edison; S. Christine Ong, Warren, all of N.J.

[73] Assignee: Mobil Oil Corporation, Fairfax, Va.

[21] Appl. No.: 36,796

[22] Filed: Mar. 25, 1993

[51] Int. Cl.$^6$ .................. C08F 210/16; C08F 2/34; C08F 4/648

[52] U.S. Cl. .................. 526/348.1; 526/129; 526/160; 526/165; 526/348; 526/348.3; 526/348.5; 526/348.6; 526/901; 526/909; 428/402

[58] Field of Search .......... 526/348.1, 129, 160, 526/165, 348, 348.3, 348.5, 348.6, 901; 428/402

[56] References Cited

U.S. PATENT DOCUMENTS

| | | | |
|---|---|---|---|
| 3,135,809 | 6/1964 | Bosmajian | 260/650 |
| 3,950,269 | 4/1976 | Setterquist | 252/430 |
| 4,188,470 | 2/1980 | Collina et al. | 526/64 |
| 4,205,021 | 5/1980 | Morita et al. | 525/240 |
| 4,243,619 | 1/1981 | Fraser et al. | 264/40.6 |
| 4,255,542 | 3/1981 | Brown et al. | 526/88 |
| 4,299,936 | 11/1981 | Candlin et al. | 526/119 |
| 4,324,691 | 4/1982 | Hartshorn et al. | 252/429 B |
| 4,333,424 | 7/1982 | Morita et al. | 526/65 |
| 4,363,904 | 12/1982 | Fraser et al. | 526/348.2 |
| 4,390,677 | 6/1983 | Karol et al. | 526/348.6 |
| 4,404,344 | 9/1983 | Sinn et al. | |
| 4,405,774 | 9/1983 | Miwa et al. | 526/348.2 |
| 4,414,369 | 11/1983 | Kuroda et al. | 526/240 |
| 4,420,520 | 12/1983 | Kato et al. | 526/65 |
| 4,438,238 | 3/1984 | Fukushima et al. | 252/240 |
| 4,478,988 | 10/1984 | Pullukat et al. | 526/128 |
| 4,522,987 | 6/1985 | Hogan et al. | 526/106 |
| 4,525,257 | 6/1985 | Kurtz et al. | 204/159.2 |
| 4,525,530 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,544,762 | 10/1985 | Kaminsky et al. | 556/179 |
| 4,563,659 | 2/1986 | Warzethan et al. | 502/111 |
| 4,564,647 | 1/1986 | Hayashi et al. | 523/211 |
| 4,578,373 | 3/1986 | Graves | 502/113 |
| 4,658,078 | 4/1987 | Slaugh et al. | 585/512 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,792,595 | 12/1988 | Cozewith et al. | 526/348 |
| 4,794,096 | 12/1988 | Ewen | 502/117 |
| 4,808,561 | 2/1989 | Welborn, Jr. | 526/129 X |
| 4,814,540 | 3/1989 | Watanabe et al. | 585/523 |
| 4,820,557 | 4/1989 | Warren | 428/34.9 |
| 4,828,786 | 4/1989 | Bacskai | 526/152 |
| 4,857,611 | 8/1989 | Durand et al. | 526/88 |
| 4,871,704 | 10/1989 | Kohara et al. | 502/114 |
| 4,874,734 | 10/1989 | Kioka et al. | 502/104 |
| 4,912,075 | 3/1990 | Chang | 502/107 |

(List continued on next page.)

FOREIGN PATENT DOCUMENTS 515132 11/1992 European Pat. Off. .
516458 12/1992 European Pat. Off. .

OTHER PUBLICATIONS

Textbook of Polymer Chemistry, F. W. Billmeyer, Jr., Wiley-Interscience, N.Y., 120–1 (1962).
Hackh's Chemical Dictionary, J. Grant (ed.) McGraw-Hill Book Co., N.Y., 341 (1969).
Sinn et al., Angew. Chem. Int. Ed. ENGL 19 (1980) 5 pages 390–392.
Kaminsky et al, Makromol. Chem., Rapid Commun. 5, 225–228 (1984).
Soga et al, Makromol Chem., Rapid Commun. 8, 305–310 (1987).
Kaminsky et al, Makromol. Chem., Rapid Commun. 4, 417–421 (1983).

*Primary Examiner*—Fred Teskin
*Attorney, Agent, or Firm*—Alexander J. McKillop; Malcolm D. Keen; Marina V. Schneller

[57] ABSTRACT

A film of a linear low density copolymer of ethylene (LLDPE) having excellent processability, optical properties and impact strength, which exhibits a density of at least 0.900.

35 Claims, No Drawings

U.S. PATENT DOCUMENTS

| | | | |
|---|---|---|---|
| 4,914,253 | 4/1990 | Chang | 585/523 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,937,301 | 6/1990 | Chang | 526/128 |
| 4,959,436 | 9/1990 | Cozewith et al. | 526/348 |
| 4,962,248 | 10/1990 | Winter et al. | 585/12 |
| 4,962,262 | 10/1990 | Winter et al. | 585/512 |
| 4,981,760 | 1/1991 | Naito et al. | 428/523 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,032,562 | 7/1991 | Lo et al. | 502/111 |
| 5,041,585 | 8/1991 | Deavenport et al. | 556/179 |
| 5,043,515 | 8/1991 | Slaugh et al. | 585/512 |
| 5,055,438 | 10/1991 | Canich | 502/117 |
| 5,057,475 | 10/1991 | Canich et al. | 502/104 |
| 5,066,631 | 11/1991 | Sangokoya et al. | 502/152 |
| 5,077,255 | 12/1991 | Welborn, Jr. | 502/104 |
| 5,084,534 | 1/1992 | Welborn, Jr. et al. | 526/160 |
| 5,084,585 | 1/1992 | Maezawa et al. | 556/179 |
| 5,086,024 | 2/1992 | Crapo et al. | 502/117 |
| 5,086,025 | 2/1992 | Chang | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,093,295 | 3/1992 | Tomotsu et al. | 502/152 |
| 5,115,068 | 5/1992 | Bailey et al. | 526/348.5 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,171,799 | 12/1992 | Kioka et al. | 26/127 |
| 5,171,871 | 12/1992 | Miyashita | 556/27 |
| 5,187,250 | 2/1993 | Asanuma et al. | 526/348.6 |
| 5,196,496 | 3/1993 | Galimberti et al. | 526/348 |
| 5,202,398 | 4/1993 | Antberg et al. | 526/129 |
| 5,204,419 | 4/1993 | Tsutsui et al. | 526/153 |
| 5,208,309 | 5/1993 | McDaniel et al. | 526/348.2 |
| 5,218,071 | 6/1993 | Tsutsui et al. | 526/348 |
| 5,272,236 | 12/1993 | Lai et al. | 526/348.5 |
| 5,278,272 | 1/1994 | Lai et al. | 526/348.5 |
| 5,290,896 | 3/1994 | Kioka et al. | 526/348 |
| 5,321,107 | 6/1994 | Tsutsui et al. | 526/138 |
| 5,324,800 | 6/1994 | Welborn, Jr. et al. | 526/160 |
| 5,324,805 | 6/1994 | Kioka et al. | 526/348.6 |

LLDPE FILMS

FIELD OF THE INVENTION

The invention relates to linear low density copolymers of ethylene (LLDPE), and films thereof, of improved and increased tensile and impact properties. The invention also relates to films of LLDPE which exhibit improved optical properties, low heat seal temperature and low extractables.

The LLDPE resin can be processed readily on commercial film extruders without modifications. The resins exhibited low melt pressure and excellent bubble stability.

SUMMARY OF THE INVENTION

The invention relates to films consisting of linear low density polyethylene, exhibiting a density of at least 0.900 g/cm and an MFR of 15 to 25.

The LLDPE exhibits a haze value as measured by ASTM D-1003 of less than about 20, preferably from 3 to 10, most preferably from 5 to 7. By comparison, the haze value of conventional LLDPE is greater than 10. Furthermore, the LLDPE of the invention exhibits Dart Drop Impact values as measured by ASTM D-1709 of greater than 800.

DETAILED DESCRIPTION OF THE INVENTION

The Copolymer Products

The catalytically produced LLDPE products of the invention have various unique properties.

The copolymer products contain 0.1 to 2 ppm of Zr. The product has an average particle size of 0.015-0.035 inches, settled bulk density from 25 to 36 lb/ft$^3$. The particles have spherical shape and are non-porous.

They are low density products characterized by a density as low as 0.902. For applications herein, the density is greater than 0.900, generally greater than 0.910, preferably ranging from 0.911 to 0.929 g/cm$^3$, most preferably ranging from 0.915 to 0.922.

Significantly, the narrow molecular weight distribution low density copolymers have been produced with MI of one (1) and less than 1, down to 0.01. The low density products of the invention exhibit a MI which can range from 0.01 to 5, generally from 0.1 to 5, and preferably from 0.5 to 4, and most preferably 0.8 to 2.0. For blown film, the MI of the copolymers is preferably 0.5 to 1.5; and for cast film the MI is preferably from 2 to 4.

The low density products of the invention exhibit a melt flow ratio (MFR) range of 15 to 25, preferably from 15 to 20. In products of the Examples the MFR ranges from 16 to 18. MFR is the ratio $I_{21}/I_2$ [wherein $I_{21}$ is measured at 190° C. in accordance with ASTM D-1238, Condition F and $I_2$ is measured at 190° C. in accordance with ASTM D-1238, Condition E.]

Melting points of the products range from 95° C. to 135° C., preferably 95° C. to 130° C. Furthermore, the hexane extractables content is very low, typically ranging from 0.3 to 1.2 wt. % preferably 0.3 to 1.0 wt. %. The $M_w/M_n$ of these products ranges from 2.5 to 3.0; $M_w$ is the weight average molecular weight and $M_n$ is the number average molecular weight, each of which is calculated from molecular weight distribution measured by GPC (gel permeation chromatography).

When fabricated into films, the films of the copolymers exhibit balanced tear strength, as measured by ASTM D1922, which ranges from 50 to 600, preferably from 220 to 420 for machine direction and from 200 to 700, preferably from 200 to 600 for the transverse direction. They also give high modulus, as measured by ASTM D882 which ranges from $1.0 \times 10^4$ to $6.0 \times 10^4$ psi, preferably from 2.2 to $4.5 \times 10^4$ psi; high tensile yield, as measured by ASTM D882 which ranges from 0.7 to $3.0 \times 10^3$ psi, preferably from 1.8 to $2.3 \times 10^3$ psi.

When fabricated into films, the films of the copolymers exhibit excellent optical qualities as determined by haze studies, measured by ASTM D-1003 which means that haze is preferably between about 3 to about 20, preferably from 4 to 10. Films of inferior haze properties exhibit a haze of greater than 10. The importance of the optical properties of LLDPE depend on the intended application of the LLDPE resin. It is generally accepted that the poor optical properties of normal LLDPEs (haze >10 and gloss <50) severely limits their use in applications where film opticals are important. The invention LLDPEs with their improved opticals (haze <10 and gloss >70) significantly broaden the application areas.

When fabricated into films, the films exhibit dart impact properties as measured by ASTM D-1709, Method A. For example, the films of the present invention exhibit superior dart drop over the films prepared with such previously-known catalysts. Films of the invention exhibit Dart Drop Impact values as measured by ASTM D-1709 from 100 to 2000, preferably from 150 to 1500. The most preferred films exhibit densities of 0.911 to 0.922 and dart drops of greater than 800, generally from 800 to 1500, and up to a measurement which characterizes the product as unbreakable, e.g., a dart drop of 2000.

The above properties are for a 1 mil film made under a standard fabricating condition outlined in the Examples, on a ¾ inch Brabender extruder, 2½" Brampton Film Extruder or a 3½" Glouster Film Extruder. It is apparent to those familiar to the field that the film properties may be further modified by optimizing the fabricating conditions or by addition of LDPE or nucleating agents.

The copolymers are produced with ethylene and one or more $C_3$-$C_{10}$ alpha-olefins, in accordance with the invention. The copolymers contain at least 80 weight % ethylene units. The comonomers used in the present invention preferably contain 3 to 8 carbon atoms. Suitable alpha olefins include propylene, butene-1, pentene-1, hexene-1, 4-methylpentene-1, heptene-1 and octene-1. Preferably, the alpha-olefin comonomer is 1- butene, 1-hexene, and 1- octene. The most preferred alpha olefin is hexene-1. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

Hydrogen may be used as a chain transfer agent in the polymerization reaction of the present invention. Any gas inert to the catalyst and reactants can also be present in the gas stream.

These products are prepared in the presence of catalyst, preferably under either slurry or fluid bed catalytic polymerization conditions described below. When made in the gas phase fluid bed process, on pilot plant scale, the product is dry and solvent-free and comprises spherical, non-porous particles, which has an average particle size of 0.015 to 0.035 inches and a settled bulk density of from 25 to 36 lb/ft$^3$.

The Catalyst

The catalyst compositions employed to produce resins and films of the present invention contain one transition metal in the form of a metallocene which has an activity of at least about 2,000 g polymer/g catalyst or about 1,000 kg polymer/g transition metal.

The catalysts comprise a carrier, an aluminoxane and at least one metallocene.

The carrier material is a solid, particulate, porous, inorganic or organic materials, but preferably inorganic material, such as an oxide of silicon and/or of aluminum. The carrier material is used in the form of a dry powder having an average particle size of from about 1 micron to about 250 microns, preferably from about 10 microns to about 150 microns. If necessary, the treated carrier material may be sieved to insure that the particles have an average particle size of preferably less than 150 microns. This is highly desirable in forming narrow molecular weight LLDPE, to reduce gels. The surface area of the carrier is at least about 3 square meters per gram (m$^2$/gm), and preferably at least about 50 m$^2$/gm up to about 350 m$^2$/gm. When the carrier is silica, it is heated to preferably about 100° C. to about 850° C. and most preferably at about 250° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 250° C. for about 4 hours to achieve a surface hydroxyl group concentration of about 1.8 millimoles per gram (mmols/gm). The silica of the most preferred embodiment is a high surface area, amorphous silica (surface area=300 m$^2$/gm; pore volume of 1.65 cm$^3$/gm), and it is a material marketed under the tradenames of Davison 952-1836, Davison 952 or Davison 955 by the Davison Chemical Division of W. R. Grace and Company. The silica is in the form of spherical particles, e.g., as obtained by a spray-drying process.

To form the catalysts, all catalyst precursor components can be dissolved with aluminoxane and reacted with a carrier. The carrier material is reacted with an aluminoxane solution, preferably methylaluminoxane, in a process described below. The class of aluminoxanes comprises oligomeric linear and/or cyclic alkylaluminoxanes represented by the formula: R—(Al(-R)—O)$_n$—AlR$_2$ for oligomeric, linear aluminoxanes and (—Al(R)—O—)$_m$ for oligomeric cyclic aluminoxane wherein n is 1-40, preferably 10-20, m is 3-40, preferably 3-20 and R is a C$_1$-C$_8$ alkyl group and preferably methyl. Methylaluminoxane (MAO) is a mixture of oligomers with a very wide distribution of molecular weights and usually with an average molecular weight of about 1000. MAO is typically kept in solution in toluene.

In a preferred embodiment, of aluminoxane incorporation into the carrier, one of the controlling factors in the aluminoxane incorporation into the carrier material during catalyst synthesis is the pore volume of the silica. In this preferred embodiment, the process of impregnating the carrier material is by infusion of the aluminoxane solution, without forming a slurry of the carrier material, such as silica, in the aluminoxane solution. The volume of the solution of the aluminoxane is sufficient to fill the pores of the carrier material without forming a slurry in which the volume of the solution exceeds the pore volume of the silica; accordingly and preferably, the maximum volume of the aluminoxane solution is and does not exceed the total pore volume of the carrier material sample. That maximum volume of the aluminoxane solution insures that no slurry of silica is formed. Accordingly, if the pore volume of the carrier material is 1.65 cm$^3$/g, then the volume of aluminoxane will be equal to or less than 1.65 cm$^3$/gram of carrier material. As a result of this proviso, the impregnated carrier material will appear dry immediatedly following impregnation although the pores of the carrier will be filled with inter alia solvent.

Solvent may be removed from the aluminoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the aluminoxane. In this step, solvent can be removed by evaporation effected at relatively low elevated temperatures of above about 40° and below about 50°. Although solvent can be removed by evaporation at relatively higher temperatures than that defined by the range above 40° and below about 50° C., very short heating times schedules must be employed.

In a preferred embodiment, the metallocene is added to the solution of the aluminoxane prior to reacting the carrier with the solution. Again the maximum volume of the aluminoxane solution also including the metallocene is the total pore volume of the carrier material sample. The mole ratio of aluminoxane provided aluminum, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the aluminoxane and metallocene compound are mixed together at a temperature of about 20° to 80° C., for 0.1 to 6.0 hours, prior to reaction with the carrier. The solvent for the metallocene and aluminoxane can be appropriate solvents, such as aromatic hydrocarbons, halogenated hydrocarbon or halogenated aromatic hydrocarbons, preferably toluene.

The metallocene compound has the formula Cp$_m$MA$_n$B$_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-chain or branched C$_1$-C$_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —CH$_2$—, —CH$_2$—CH$_2$—, —CR'R"— and —CR'R"—CR'R"— where R' and R" are short alkyl groups or hydrogen, —Si(CH$_3$)$_2$—, Si(CH$_3$)$_2$—CH$_2$—CH$_2$—Si(CH$_3$)$_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl or aromatic groups, they are preferably straight-chain or branched C$_1$-C$_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is titanium, zirconium or hafnium, halide groups are preferably chlorine and the alkyl groups are C$_1$-C$_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(iso-butylcyclopentadienyl) zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

The catalyst comprising a metallocene compound and an aluminoxane in particulate form is fed to the fluid bed reactor for gas phase polymerizations and copolymerizations of ethylene and higher alpha olefins.

The Process Conditions

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 60° to 115° C. is preferred, and a temperature of about 75° to 95° C. is most preferred.

The fluid bed reactor is operated at pressures of about 150 to 350 psi, with operation at the higher pressures in such ranges favoring heat transfer since an increase in pressure increases the unit volume heat capacity of the gas.

A "diluent" gas is employed with the comonomers. It is nonreactive under the conditions in the polymerization reactor. The diluent gas can be nitrogen, argon, helium, methane, ethane, and the like.

In fluidized bed reactors, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient. The feed stream of gaseous monomer, with or without inert gaseous diluents, is fed into the reactor at a space time yield of about 2 to 10 pounds/hour/cubic foot of bed volume.

A particularly desirable method for producing linear low density polyethylene polymers according to the present invention is in a single fluid bed reactor unit which is shown and is also described in U.S. Pat. No. 4,481,301, which is relied upon and incorporated by reference herein.

For film production, the products may contain any of various additives conventionally added to polymer compositions such as lubricants, microtalc, stabilizer, antioxidants, compatibilizers, pigments, etc. These reagents can be employed to stabilize the products against oxidation. For example, additive packages comprising 400–1200 ppm hindered phenol(s); 700–2000 ppm phosphites; 250 to 1000 ppm antistats and 250–1000 ppm stearates, for addition to the resin powders, can be used for pelletization. The polymers can be added directly to a blown film extruder, e.g., a Sterling extruder, to produce films having a thickness, for example of about 0.5 to 5 mils.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - a plaque is made and conditioned for one hour at 100° C. to approach equilibrium crystallinity. Measurement for density is then made in a density gradient column; reported as gms/cc. |
| Melt Index (MI), $I_2$ | ASTM D-1238 - Condition E Measured at 190° C. - reported as grams per 10 minutes. |
| High Load Melt Index (HLMI), $I_{21}$ | ASTM D-1238 - Condition F Measured at 10.5 times the weight used in the melt index test above. |
| Melt Flow Ratio (MFR) | $\dfrac{I_{21}}{I_2}$ |

EXAMPLES

Example 1

Raw materials used in catalyst preparation included 505 g of Davison 952-1836 silica, 698 g of methylaluminoxane in toluene solution (30 wt.% MAO), 7,148 g of bis(n-butylcyclopentadienyl) zirconium dichloride.

The steps of the catalyst preparation are set forth below:

1. Dehydrate the 955 silica at 250° C. for 4 hours using air to purge. Then purge with nitrogen on cooling.
2. Transfer the silica to a mix-vessel.
3. Add 7.148 g of bis(n-butylcyclopentadienyl) zirconium dichloride and 698 g of methylaluminoxane to a bottle.
4. Agitate the catalyst solution in the bottle until the metallocene dissolves in the MAO solution.
5. Transfer the MAO and metallocene solution into the mix-vessel containing the dehydrated 955 silica slowly while agitating the silica bed vigorously to make sure that the catalyst solution is well dispersed into the silica bed.
6. After the addition, continue to agitate the catalyst for ½ hours.
7. Start drying the catalyst by purging with nitrogen for 5 hours at 45° C.
8. Sieve the catalyst to remove particles larger than 150 micron.
9. The catalyst has the following analysis:
Yield = 914 g catalyst (from 500 g of silica)
Al = 10 wt. %
Zr = 0.2 wt. %

Example 2

To produce a polymer for low density film, 0.918 g/cc, 1 MI, 17 MFR, in a fluid bed gas phase reactor the following process conditions were employed.

Process Conditions:

| | |
|---|---|
| Fluidization velocity | 1.7 ft/sec |
| Residence time | 2.5 hours |
| Temperature | 77.5° C. |
| Ethylene | 180 psi |
| Hexene | 3.6 psi |
| Isopentane | 50 psi |
| Carbon dioxide | 1.1 ppm |
| Ash | 200 to 250 ppm |

The catalyst was that of Example 1.

Example 3

To produce a polymer for cast film of 0.918 g/cc density, 2.5 MI, 16 MFR, the following process conditions were employed:

| | |
|---|---|
| Fluidization velocity | 1.7 ft/sec |
| Residence time | 2.5 hours |
| Temperature | 77.5° C. |
| Ethylene | 180 psi |
| Hexene | 3.6 psi |
| Isopentane | 38 psi |
| Ash | 100 ppm |

The catalyst was that of Example 1.

1. Resin Characteristics

When compared to a standard ethylene-hexene copolymer prepared with commercial Ziegler catalyst, the metallocene of Example 1 produced resins via the gas phase process which exhibit the following characteristics: (1) narrower molecular weight distribution (2) more uniform short chain branching distribution, (3) lower melting point (4) lower extractables, and (5) lower haze.

An example of the key resin characteristics of a 1.0 $I_2$, 0.918 density resin is shown below:

TABLE I

| | LLDPE Resin Characteristics 1.0 $I_2$, 0.918 density | |
|---|---|---|
| Property | Commercial Ziegler | Metallocene (of Ex. 1) |
| Mw/Mn | 4.5 | 2.6 |
| MFR | 28 | 18 |
| Melting point (degree C.) | 125 | 115 |

2. End-use Property

These metallocene LLDPE resins can be processed readily on commercial equipment without modification. They also offer superior properties compared to those resins produced using commercial Ziegler/Natta catalysts. An example is given below:

TABLE II

| | LLDPE Film Property Comparison 1.0 $I_2$, 0.918 density 2:1 BUR, 250 lb/hr | |
|---|---|---|
| Property | Commercial Ziegler | Metallocene (of Ex. 1) |
| Melt Pressure, psi | 5000 | 5500 |
| Bubble Stability | Very good | Very good |
| MD Modulus, $10^4$ psi | 2.8 | 2.5 |
| Dart Drop, gm | 180–450 | >800 |
| MD Tear, g/mil | 350–450 | 370 |
| Extractables, wt. % | 2.5 | 0.6 |
| Haze, % | 10–18 | 5–7 |
| Tensile Yield (× $10^3$ psi) | 1.7 | 2.0 |
| Yield Elongation % | 24 | 71 |

What is claimed is:

1. A film, exhibiting a haze, determined by ASTM D-1003, ranging from 3 to about 20; and a dart impact value, measured by ASTM D-1709, which ranges from about greater than 100 and up to about 2000, a hexane extractables content of 0.3 to about 1.2 wt. % and comprising a LLDPE comprising ethylene and an alpha olefin of 3 to 10 carbon atoms, which has a density ranging from 0.900 to 0.929; MFR of 15 to 25; a $M_w/M_n$ of from about 2.5 to about 3.0 and melting point ranging from 95° C. to 135° C.

2. The film of claim 1 wherein the LLDPE is further characterized by an MI($I_2$) of 0.01 to 5.0.

3. The film of claim 1 wherein the alpha olefin is hexene-1.

4. The film of claim 2 wherein wherein the alpha olefin is hexene-1.

5. The film of claim 4 wherein said dart impact ranges from greater than about 800 up to 2000.

6. The film of claim 3 wherein said density ranges from about 0.911 to 0.929.

7. The film of claim 3 wherein said density ranges from 0.911 to 0.922.

8. The film of claim 5 wherein said density ranges from 0.911 to 0.922.

9. The film of claim 1, where the film is characterized by tensile yield, measured by ASTM D882 which ranges from 0.7 to 3.0×$10^3$ psi.

10. The film of claim 1, wherein the alpha olefin contains 3 to 8 carbon atoms.

11. The film of claim 1, wherein the alpha olefin is selected from the group consisting of propylene, butene-1, pentene-1, hexene-1, 4-methylpentene-1, heptene-1, and octene-1.

12. The film of claim 1, wherein the LLDPE contains 0.1 to 2 ppm Zr.

13. A film exhibiting a haze, determined by ASTM D-1003, ranging from 3 to about 20 and a dart impact value, measured by ASTM D-1709, which ranges from greater than 100 and up to about 2000, comprising a linear copolymer of ethylene and an alpha olefin of 3 to 10 carbon atoms, which has a density ranging from 0.900 to 0.929; MFR in the range of 15 to 25; and a zirconium content of 0.1 to 2 ppm Zr.

14. The film of claim 13, wherein the MFR is in the range of 15 to 20.

15. The film of claim 14, wherein the alpha olefin contains 3 to 8 carbon atoms.

16. The film of claim 15, wherein the alpha olefin is selected from the group consisting of propylene, butene-1, pentene-1, hexene-1, 4-methylpentene-1, heptene-1, and octene-1.

17. The film of claim 16 wherein the copolymer is characterized by $M_w/M_n$ which ranges from 2.5 to 3.0.

18. The film of claim 16 wherein the film is characterized by tensile yield, measured by ASTM D882 which ranges from 0.7 to $3.0 \times 10^3$.

19. The film of claim 16, wherein said dart impact ranges from 800–2000.

20. The film of claim 19, wherein said density ranges from 0.911 to 0.922.

21. The film of claim 20, where the film is characterized by tensile yield, measured by ASTM D882 which ranges from 1.4 to $3.0 \times 10^3$ psi.

22. An as-synthesized composition which is dry and solvent-free and comprises spherical, non-porous particles, which has an average particle size of 0.015 to 0.035 inches, and a settled bulk density of from 25 to 36 lb/ft$^3$, and which is a copolymer of ethylene and an alpha olefin of 3 to 10 carbon atoms, having a density of 0.900 to 0.929, MFR of 15 to about 20, and containing 0.1 to 2 ppm Zr.

23. The composition of claim 22, wherein the copolymer is further characterized by an MI($I_2$) of 0.1 to 5.0.

24. The composition of claim 22, wherein the copolymer is further characterized by an MI($I_2$) of 0.5 to 3.0.

25. The composition of claim 22, wherein the copolymer is further characterized by an MI($I_2$) of 0.8 to 2.0.

26. The composition of claim 22, wherein said density ranges from about 0.911 to about 0.922.

27. The composition of claim 23, wherein said density ranges from about 0.911 to about 0.922.

28. The composition of claim 24, wherein said density ranges from about 0.911 to about 0.922.

29. The composition of claim 25, wherein said density ranges from about 0.911 to about 0.922.

30. The composition of claim 22, wherein the density is 0.911 to 0.929.

31. The composition of claim 22, wherein the alpha olefin contains 3 to 8 carbon atoms.

32. The composition of claim 31, wherein the alpha olefin is selected from the group consisting of propylene, butene-1, pentene-1, hexene-1, 4-methylpentene-1, heptene-1, and octene-1.

33. The composition of claim 22, wherein the copolymer is characterized by $M_w/M_n$ which ranges from 2.5 to 3.0.

34. A gas phase process for producing an as-synthesized composition which is dry and solvent-free and comprises spherical, non-porous particles, which has an average particle size of 0.015 to 0.035 inches, and a settled bulk density of from 25 to 36 lb/ft$^3$ and which is a copolymer of ethylene and an alpha olefin, which has a density of 0.902 to 0.929, a MFR of 15 to about 20, and a $M_w/M_n$ of from about 2.5 to about 3.0, comprising contacting ethylene and said alpha olefin with a catalyst at a temperature of about 60° C. to about 95° C. at a pressure of from about 100 to about 350 psi, wherein the catalyst comprises silica having reactive hydroxyl groups and impregnated with a zirconocene compound and an aluminoxane, and which has an Al to Zr ratio of from 50 to 500.

35. The product produced by the process of claim 34.

* * * * *